Figure 1:
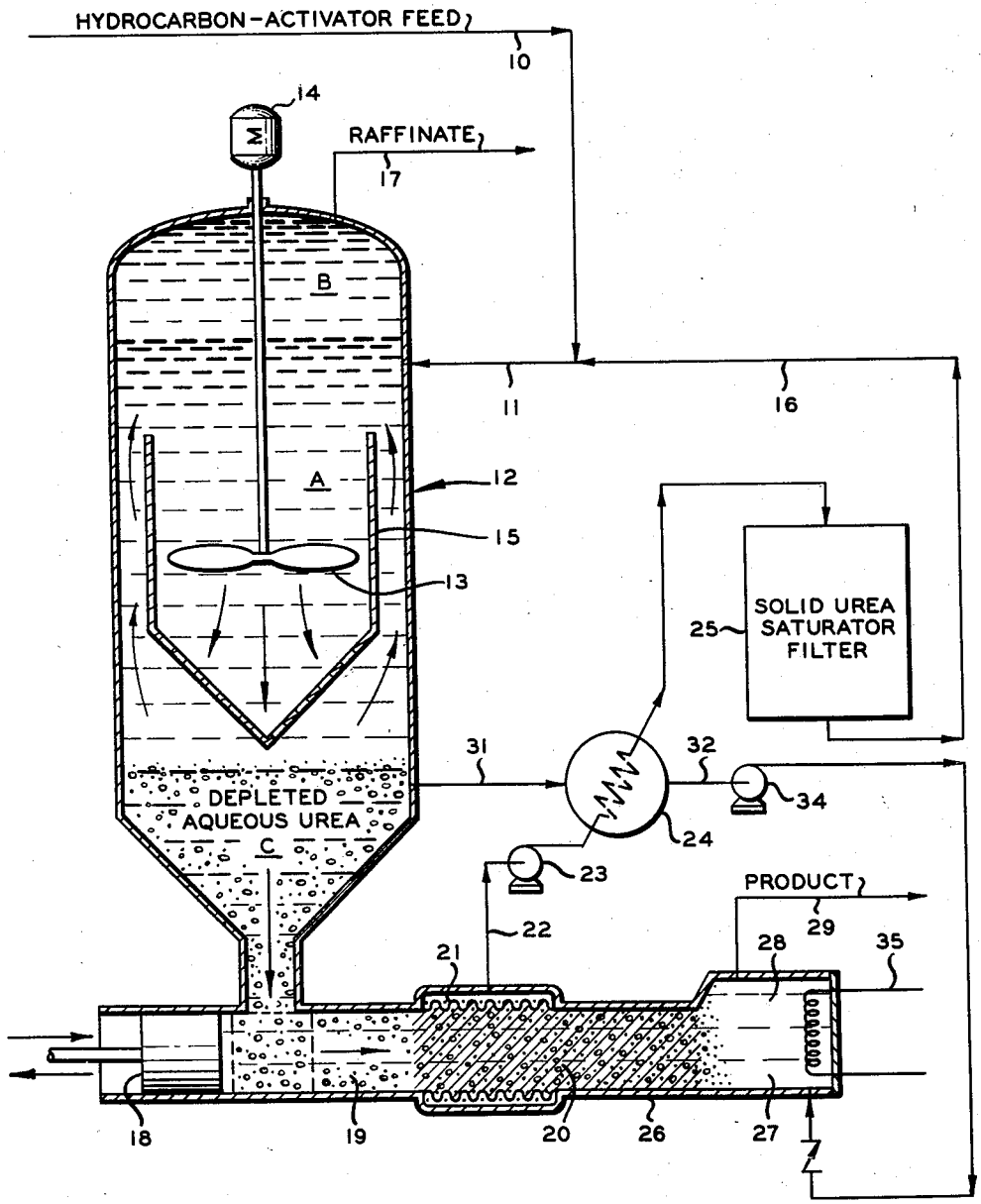

May 24, 1960 J. W. CLARK 2,938,022
SEPARATION PROCESS AND APPARATUS
Filed Feb. 11, 1957 2 Sheets-Sheet 1

INVENTOR.
J.W. CLARK
BY Hudson and Young
ATTORNEYS

United States Patent Office 2,938,022
Patented May 24, 1960

2,938,022

SEPARATION PROCESS AND APPARATUS

Joseph W. Clark, Borger, Tex., assignor to Phillips Petroleum Company, a corporation of Delaware Filed Feb. 11, 1957, Ser. No. 639,254

12 Claims. (Cl. 260—96.5)

This invention relates to an improved process for the separation of organic compounds. In one of its aspects it relates to a continuous process for the formation of amide-hydrocarbon adducts wherein the adduct is washed free of occluded hydrocarbons prior to its subsequent decomposition. In another of its aspects it relates to a means for carrying out the improved separation process.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B.P 125.6° C.) cannot be economically separated from 2,2,4-trimethylhexane (B.P. 125.5° C.) because of the small difference in boiling points. Such a separation is often desirable as, for example, in a gasoline manufacturing process in order to improve the octane rating of the gasoline by removal of the low octane straight-chain hydrocarbon therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof.

While urea forms adducts with organic compounds having straight carbon atom chains, another amide, viz., thiourea ($CS(NH_2)_2$), forms adducts with organic compounds having branched carbon atom chains. Thus, the adduct-forming property of thiourea permits a ready separation of such organic compounds from organic compounds having straight carbon atom chains, since the latter do not form adducts with thiourea.

Various methods have been suggested for the separation of hydrocarbon mixtures by utilizing the adduct-forming properties of the above-referred to amides. One disadvantage to processes based on the adduct-forming characteristics of the amides is that the process does not lend itself easily to continuous operation and batch-type processes are not easily assimilated by modern production methods. My invention is directed to a solution of this problem and it is a feature of the invention that a step of washing occluded impurities from the adducts is incorporated as an integral part of the process.

It is an object of this invention to provide a continuous process for the separation of organic compounds. It is another object of this invention to provide a process for producing a substantially pure organic compound. It is another object to provide a method for the separation of the organic compounds by the amide adduct process wherein impurities are washed from the adducts prior to their subsequent decomposition. It is still another object of this invention to provide a novel and simple means for carrying out the heretofore stated objects. Further and additional objects and advantages of this invention will be readily apparent from the disclosure and discussion hereinbelow.

I have discovered that substantially pure organic compounds can be produced in good yield in a continuous operation by forming adducts of urea or thiourea with the desired organic compound which is contained in a mixture with other compounds which do not form such adducts, after which the adducts are passed as an aqueous slurry with amide-saturated water through a filtration zone where the water is removed and to a melting zone where the adduct is decomposed by heat. A portion of the organic compound resulting from decomposition of the adduct passes in countercurrent relationship to the flow of the adduct crystals to the hereinbefore referred to filter zone and removes occluded impurities from the adduct crystals prior to their decomposition. Amide-saturated water is removed from the aqueous phase of the reactor and is introduced into the decomposition zone where the temperature is raised so as to dissolve amide freed by the decomposition of the adduct and also aids in causing countercurrent flow of the organic compound to that of the mass of adduct crystals. The organic compounds which form adducts with urea and thiourea are well known in the art and are set forth, at least in part, in U.S. Patent 2,698,321, which issued December 28, 1954, to R. A. Findlay.

Figure 2:
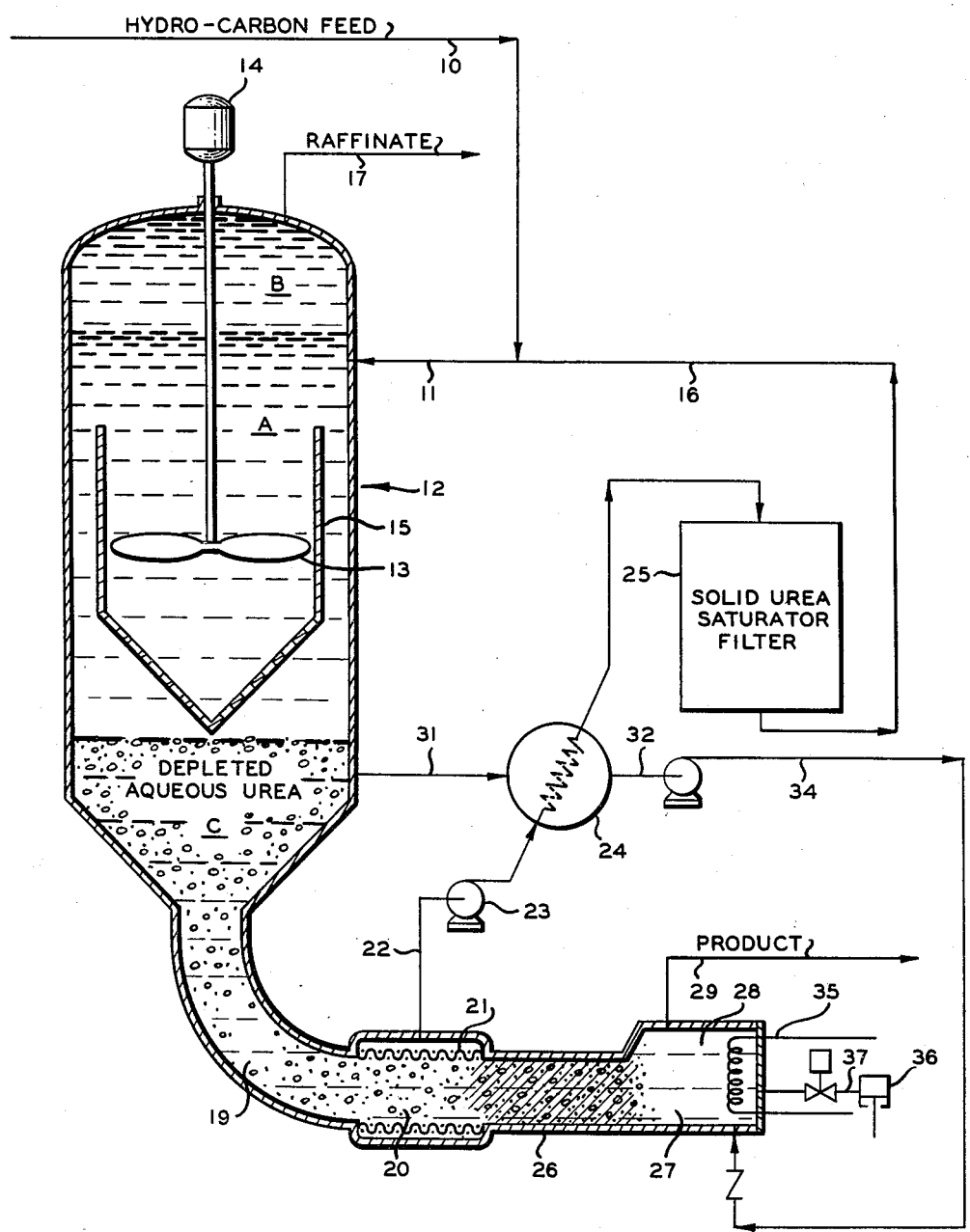

Figure 1 of the drawing is an elevation view, partly cut away, of a system for practicing a preferred embodiment of my invention; and Figure 2 is a modification of the embodiment of the invention shown in Figure 1.

Hereafter in the drawing like elements in the figures are designated by like numbers wherever possible. This drawing does not include conventional equipment, such as temperature and pressure controls, flow controllers, and the like, but the inclusion of such equipment is understood by those skilled in the art and is within the scope of my invention.

Referring now to Figure 1 of the drawing, a stream comprising a hydrocarbon mixture and an activator is fed via conduits 10 and 11 to reactor 12. The hydrocarbon mixture can be, for example, a mixture of normal hexadecane (cetane) and isomers of hexadecane. The activator can be, for example, methylethyl ketone. Reactor 12 comprises a closed vessel containing an agitator such as impeller stirrer 13 which is actuated by motor 14. The impeller stirrer is preferably positioned within a housing 15 so as to promote circulation of the contents of the reactor, as indicated by the small arrows, and to assure complete mixing of the reactants. The action of the stirrer is sufficient to obtain thorough mixing of the reactants without the formation of an emulsion. A saturated solution of amide, such as urea, is passed via conduits 16 and 11 into the reactor 12.

The reactor is operated at a temperature below the decomposition temperature of the adduct of the amide and the hydrocarbon being adducted. Thus, in the case of cetane and urea the temperature is maintained below about 124–128° F. which is the decomposition temperature of a cetane-urea adduct. It is often preferred to operate the adduct-forming reaction at room temperatures of about 60–80° F. Since the adduct-forming reaction is exothermic, it may be necessary to provide the reactor 12 with means for removing excess heat. For example, the mixing zone of the reactor can be water-jacketed or cooling coils can be provided within the mixing zone. Also, it may be desirable to provide line 11 with cooling means in order to cool the mixture entering the reaction zone.

The reactants in the reactor comprise an aqueous-oil mixture and the contents of the reactor stratify into an intermediate mixing zone A, a layer of unreacted hydrocarbons in the upper zone B and an aqueous layer C in the lower portion of the reactor which also contains the solid urea adducts. The unreacted, branched-chain hydrocarbons are withdrawn from zone B via conduit 17. The urea adducts in zone C settle to the bottom and a concentrated slurry of solid adduct crystals are forced by reciprocating piston 18 through conduit 19 to filter zone 20 which contains a liquid permeable, crystal impermeable membrane 21. Liquid is withdrawn from filter section 20 and is passed via conduit 22 and pump 23 through heat exchanger 24 to the saturator filter 25. A saturated aqueous solution is withdrawn from saturator-filter 25 via conduit 16 and is passed to reactor 12 via conduit 11. The adduct crystal mass is forced through filter section 20 to washing or refluxing section 26 and thence to decomposition zone 27. The upper portion of decomposition zone 27 indicated at 28 forms a collection zone for purified organic compound which is withdrawn therefrom via conduit 29.

An amide depleted aqueous amide solution is removed from reactor 12 via conduit 31 and is passed through heat exchanger 24 via conduit 32 and pump 34 to the decomposition zone 27. The temperature of the contents of decomposition zone 27 is raised to a temperature above the decomposition temperature of the adducts by heater 35.

Referring now to the modification in Figure 2 the operation of the process is similar to that of Figure 1 except that the concentrated slurry of solid adducts gravitates through conduit 19 and the movement of the body of solids is facilitated by pulsations through the material in zones 27, 26, 20 and conduit 19 produced by pulse pump 36 acting through conduit 37. The pulsations tend to maintain the solid adducts in particulate form by minimizing opportunity for the individual particles to fuse or freeze together. The pulsations also discourage channeling of the flushing or reflux liquid through the adduct bed. In the operation of the process of this invention the adduct is forced through the filter zone as a fairly compact mass of crystal-like adduct particles containing a minor amount of amide depleted aqueous solution. The mass of adduct particles is then passed through the washing or refluxing section in countercurrent flow relationship to a flow of amide depleted aqueous solution together with a portion of the liquid organic compound resulting from decomposition of the adduct. The amide which is released upon decomposition of the adduct is dissolved in the aqueous solution and is carried out through the liquid solids separation zone in the form of liquid. The materials in the decomposition zone are heated to a temperature above the decomposition temperature of the adduct and as the aqueous solution passes countercurrent to the adduct particles, this heat is given up in decomposing the adduct so that the solution arriving at the filter zone is at a temperature below the decomposition temperature of the adduct.

In the process of the invention as practiced with the system shown in Figure 1, the temperature of the contents of reactor 12 is maintained at about 60 to 80° F. when a hydrocarbon mixture comprising normal hexadecane (cetane) and isomers of hexadecane is reacted with a saturated aqueous urea solution. Methylethyl ketone is a suitable activator.

The decomposition temperature of a hexadecane-urea adduct is about 124 to 128° F. and therefore the temperature of the decomposition zone 27 is maintained at a temperature of about 130° F. The depleted amide solution flowing in countercurrent relationship with the flow of urea adducts through refluxing zone 26 gives up heat in decomposing and heating the adducts so that the amide solution, enriched in dissolved amide, reaches the filter section at a temperature of about 105 to 110° F. and the stream of amide solution leaves the filter zone at a temperature of about 85 to 100° F. This stream is heat exchanged with the stream of depleted amide solution passing to decomposition zone 27 and is saturated with urea before being returned to reactor 12.

Liquid product is recovered via conduit 29 at substantially the rate of adduct decomposition so as to prevent an appreciable amount of liquid organic compound from passing through zone 26 to filter 21. Liquid organic compound which passes through filter 21 can be separated in a phase separator (not shown) or can be recycled to reactor 12.

Similar temperature differentials are maintained for processes directed to adducts having other decomposition temperatures. Thus in the case of normal hexane-urea adducts the decomposition zone temperature is maintained at about 80 to 85° F. or higher and the reactor temperature is maintained at about 50 to 70° F.; in the case of normal heptane-urea adducts the decomposition zone temperature is maintained at about 85 to 90° F. or higher and the reactor temperature is maintained at about 50 to 70° F.; and in the case of normal octane-urea adducts the decomposition zone temperature is maintained at about 90 to 100° F. or higher and the reactor temperature is maintained at about 60 to 80° F.

*Example*

A substantially saturated, refinery hydrocarbon stream comprising normal hexane and undetermined isomers of hexane having a boiling range from about 120° F. to about 160° F., and containing about 5 weight percent of methylethyl ketone activator is introduced into a reactor, as shown in Figure 1, together with about an equal volume of a saturated aqueous solution of urea. The reactor is operated at atmospheric pressure and a temperature of about 60° F. Unreacted hydrocarbons are withdrawn from the top of the reactor. The piston is operated at about 5 cycles per minute. The temperature in the decomposition zone is maintained at about 85° F. Substantially pure normal hexane is withdrawn via the product line.

Examples of separations which can be made using the present invention include the separation of normal hexane from neohexane, diisopropyl, 2-methylpentane and 3-methylpentane employing urea to adduct normal hexane or thiourea to adduct the branched-chain isomers. Urea can be used to form adducts with normal octane to effect separation from 2-methylheptane, 3-ethylhexane, 2,2,4-trimethylpentane, and the like; whereas thiourea can be adducted with the branched-chain isomers. Normal nonane can be adducted with urea to effect a separation from branched-chain isomers such as 2,2,4,4-tetramethylpentane, 2,2,5-trimethylhexane, 4-methyloctane, and the like and the branched-chain can, in a similar manner, be adducted with thiourea to effect such separation from normal nonane.

Activators such as alcohols, ketones, and the like are commonly used in forming adducts in an amount of 0.01 to 20 weight percent of the amide employed.

The description of the invention has been directed to the separation of organic compounds less dense than the aqueous amide solution so that the unreacted hydrocarbons are removed from the reactor as a separate upper phase. The invention, however, is not limited to the separation of organic compounds having a specific gravity less than that of water or the aqueous amide solution because the system can conveniently be modified to effect the separation of organic compounds of equal or greater density with respect to the aqueous phase. Thus, for the separation of the heavier organic compounds all of the reactor contents are passed through the conduit 19. The unreacted organic compounds and aqueous amide solution are passed through the filter 21 to a phase separator (not shown). The partly depleted amide solution is withdrawn from the phase separator, heated if desired, and passed to the decomposition zone 27, at or near the top of that zone. Alternatively, amide depleted solution which tends to separate as a separate upper phase in the reactor can be withdrawn and passed to the decomposition zone with or without heating. Make-up water can conveniently be added at this point whereas in the system shown in Figure 1 the make-up water is ordinarily added at the amide saturator. Adduct-forming product is withdrawn from the bottom of decomposition zone 28. Non-adducted heavy organic liquid is withdrawn from the lower phase of the settling zone as an additional product.

Normal hexadecyl iodide can thus be separated from isomers such as 2,3,4-trimethyltridecyl iodide, 2,4,6-triethyldecyl iodide, 5-t-butyldodecyl iodide, and the like. These halogenated hydrocarbons are exemplary of organic compounds, heavier than water, which can be separated according to the process of the invention.

The invention is also applicable to the separation of organic compounds in general where one organic compound in an admixture will form a solid complex with a complexing agent and the other constituents of the organic admixture will not form a solid complex with the complexing agent. Examples of such separations include the separation of butadiene from more saturated hydrocarbons such as butene and butane which comprises contacting the butadiene-containing hydrocarbon mixture with a solution of cuprous chloride in a solvent such as 1-butene, at a temperature in the range of −20 to +20° F. and at atmospheric pressure or slightly higher, separating the solid complex formed, and decomposing the complex at a temperature in the range of 140 to 210° F. so as to recover substantially pure butadiene.

Another example of the separation of organic compounds by complex formation comprises the formation of solid clathrate complexes with such compounds as benzene, aniline, phenol, thiophene, furan, and pyrrole by contacting organic mixtures containing such compounds with an aqueous ammoniacal solution of $Ni(CN)_2$. For example, benzene can be separated from a hydrocarbon mixture containing benzene by contacting the mixture with an aqueous ammoniacal solution of $Ni(CN)_2$ at a temperature in the range of 32 to 104° F., from about atmospheric to about 10 p.s.i., and at a $Ni(CN)_2$ to benzene ratio of about 1:1 to about 5:1. Substantially pure benzene is recovered by decomposing the clathrate at a temperature in the range of 257 to 392° F. at ordinary pressures.

Certain small molecule organic compounds can also be separated from large molecule organic compounds by contacting an admixture containing them with hydroquinone (quinol); for example methanol can be separated from admixture with 2-methyl-furan and/or 3-methylfuran by contacting the mixture with quinol so as to form a complex with methanol, separating the solid quinol adducts, and decomposing the adduct to recover substantially pure methanol.

Reasonable variations and modifications are possible within the scope of the disclosure of the present invention, the essence of which is the provision of a process and apparatus for urea and thiourea adduct decomposition wherein occluded impurities are washed from the adducts prior to decomposition by a countercurrent stream of hot depleted urea or thiourea solution and purified adducted organic compound.

That which is claimed is:

1. A process for resolving a liquid mixture of organic compounds, wherein one of said compounds is reactive with an amide selected from the group consisting of urea and thiourea to form a solid adduct therewith, which comprises passing said mixture together with a saturated aqueous solution of said amide into a reaction zone; intimately admixing the contents of said reaction zone at a temperature below the decomposition temperature of the adduct of the amide and the organic compound; decanting unreacted organic compound from the upper portion of said reaction zone as a product of the process; maintaining an aqueous phase settling zone below and contiguous with said reaction zone; removing a concentrated slurry of adduct in amide depleted aqueous solution from the lower portion of said settling zone; passing said slurry through a substantially horizontal liquid-solid separation zone; removing liquid from said separation zone; passing liquid from said separation zone in heat exchange relationship with hereinafter referred to amide depleted solution and to an amide saturation zone; saturating said solution with amide; passing saturated amide solution to said reaction zone together with said mixture of organic compounds as hereinbefore described; passing solids from said separation zone to a combined decomposition and phase separation zone maintained at a temperature above the decomposition temperature of said adduct as a substantially unidirectional flow of solids; intermittently applying pressure from an external source to said solids passing through said separation zone to said combined decomposition and phase separation zone to compact said solids; decomposing said adduct in said decomposition zone; forming an aqueous phase and a liquid organic phase in said combined decomposition and phase separation zone; passing amide depleted solution from said settling zone in heat exchange relationship with liquid from said separation zone and through said combined decomposition and phase separation zone in countercurrent flow relationship to the flow of solid adduct passing to said combined and phase separation decomposition zone; passing a portion of liquid organic phase resulting from decomposition of said adduct in countercurrent flow relationship to the flow of solid adduct passing to the combined decomposition and phase separation zone; and removing remaining liquid organic phase from said combined decomposition and phase separation zone as an additional product of the process.

2. A process for resolving a liquid mixture of organic compounds wherein one of said compounds is reactive with an amide selected from the group consisting of urea and thiourea to form a solid adduct therewith which comprises passing said mixture together with a saturated aqueous solution of said amide into a reaction zone; intimately admixing the contents of said reaction zone at a temperature below the decomposition temperature of the adduct of the amide and the organic compound; decanting unreacted organic compound from the upper portion of said reaction zone as a product of the process; maintaining an aqueous phase settling zone below and contiguous with said reaction zone, removing a concentrated slurry of adduct in amide depleted aqueous solution from the lower portion of said settling zone; passing said slurry through a substantially horizontal liquid-solid separation zone; removing liquid from said separation zone; passing solids from said separation zone to a combined decomposition and phase separation zone maintained at a temperature above the decomposition temperature of said adduct; intermittently applying pressure from an external source to said solids passing through said separation zone to said combined decomposition and phase separation zone to compact said solids; decomposing said adduct in said decomposition zone; forming an aqueous phase and a liquid organic phase in said combined decomposition and phase separation zone; passing amide depleted solution from said settling zone through said combined decomposition and phase separation zone and in countercurrent flow relationship to the flow of solid adduct to said combined decomposition and phase separation zone, and removing liquid organic compound from said combined decomposition and phase separation zone as an additional product of the process.

3. The process of claim 2 wherein the liquid mixture comprises normal hexadecane and isomers of hexadecane, the amide is urea, the temperature in the reaction zone is maintained in the range of about 60–80° F., and the temperature in the combined decomposition and phase separation zone is maintained in the range of about 130–150° F.

4. The process of claim 2 wherein the liquid mixture comprises normal octane and isomers of octane, the amide is urea, the temperature in the reaction zone is maintained in the range of about 50–70° F., and the temperature in the combined decomposition and phase separation zone is maintained in the range of about 90–100° F.

5. The process of claim 2 wherein the liquid mixture comprises normal heptane and isomers of heptane, the amide is urea, the temperature in the reaction zone is maintained in the range of about 50–70° F., and the temperature in the combined decomposition and phase separation zone is maintained in the range of about 85–90° F.

6. The process of claim 2 wherein the liquid mixture comprises normal hexane and isomers of hexane, the amide is urea, the temperature in the reaction zone is maintained in the range of about 50–70° F., and the temperature in the combined decomposition and phase separation zone is maintained in the range of about 80–85° F.

7. A process for resolving a liquid mixture of hydrocarbons containing both normal and isomeric hydrocarbons which comprises intimately contacting said mixture with a saturated aqueous solution of urea so as to form normal hydrocarbon-urea adducts and a urea depleted aqueous solution, passing said adducts and a first portion of said urea depleted solution through a liquid-solid separation zone; removing liquid therefrom; passing said solid adduct to a combined decomposition and phase separation zone maintained above the decomposition temperature of the adduct; intermittently applying pressure from an external source to said solids passing through said separation zone to said combined decomposition and phase separation zone to compact said solids; passing a second portion of said urea depleted solution through said combined decomposition and phase separation zone and to said liquid-solid separation zone in countercurrent flow relationship to the flow of solid adduct; decomposing said adduct in said combined decomposition and phase separation zone; forming an aqueous phase and a liquid normal paraffin hydrocarbon phase in said combined decomposition and phase separation zone; and recovering liquid normal paraffin hydrocarbon from said combined decomposition and phase separation zone as a product of the process.

8. A process for resolving a liquid mixture of organic compounds, wherein one of said compounds is reactive with an amide selected from the group consisting of urea and thiourea to form a solid adduct therewith, which comprises passing said mixture, together with a saturated aqueous solution of said amide, into a reaction zone; intimately admixing the contents of said reaction zone at a temperature below the decomposition temperature of the adduct of the amide and the organic compounds; decanting unreacted organic compound from the upper portion of said reaction zone as a product of the process; maintaining an aqueous phase settling zone below and contiguous with said reaction zone; removing a concentrated slurry of adduct in amide depleted aqueous solution from the lower portion of said setting zone; passing said slurry through a liquid-solid separation zone; removing liquid from said separation zone; passing liquid from said separation zone in heat exchange relationship with hereinafter referred to amide-depleted solution and to an amide saturation zone; saturating said solution with amide; passing saturated amide solution to said reaction zone as hereinbefore described; passing adducts as a substantially unidirectional flow of solids from said separation zone to a combined decomposition and phase separation zone maintained at a temperature above the decomposition temperature of said adduct; intermittently applying pressure from an external source into said solids passing through said separation zone to said combined decomposition and phase separation zone to compact said solids and to move said solids through said separation zone; forming an aqueous phase and a liquid organic phase in said combined decomposition and phase separation zone; passing amide depleted solution from said settling zone in heat exchange relationship with liquid from said liquid separation zone and to said combined decomposition and phase separation zone and in countercurrent flow relation to the flow of solid adduct to said combined decomposition and phase separation zone; and removing liquid organic phase from said combined decomposition and phase separation zone as an additional product of the process.

9. A process for resolving a liquid mixture of organic compounds wherein one of said compounds is reactive with a complexing agent to form a solid complex therewith which comprises intimately contacting said mixture with a saturated solution of said complexing agent so as to form a solid complex; decanting the compounds not reactive with the complexing agent; passing said solid complex and depleted complexing agent solution through a liquid-solid separation zone to a combined decomposition and phase separation zone maintained above the decomposition temperature of the complex; intermittently applying pressure from an external source to solids passing through said separation zone to said combined decomposition and phase separation zone to compact said solids; decomposing said complex in said combined decomposition and phase separation zone; passing unsaturated complexing agent solution to said combined decomposition and phase separating zone and in countercurrent flow relationship to said complex being passed to said combined decomposition and phase separation zone; and recovering liquid organic phase from said combined decomposition and phase separation zone as a product of the process.

10. Apparatus for separation of adduct forming organic compounds from admixture with non-adduct forming compounds which comprises an elongated vertical reactor vessel having a feed inlet intermediate the top and bottom portions, a non-adduct forming organic compound outlet in the top portion, and an adduct and depleted adduct forming solution outlet at the bottom portion thereof; an elongated horizontal vessel situated below said reactor vessel having one end thereof in communication with the bottom outlet of said reactor and having a heated means in the other end and a liquid-solid separation means situated intermediate the ends of said elongated vessel; means for adding organic feed material to said feed inlet of said reactor; means for adding solution of adduct former to said inlet to said reactor; means to urge a slurry of adduct and depleted adduct forming solution through said liquid-solid separation zone of said elongated horizontal vessel and toward the heating means in said horizontal vessel; means for removing adduct forming agent depleted solution from the lower portion of said reactor and passing same to the heating means end of said elongated horizontal vessel; a vessel for saturating adduct former solution; means for removing liquid from said liquid-solid separation means and passing same to said adduct former saturation vessel; means for exchanging heat between said adduct former depleted solution withdrawn from said reactor and with said liquid withdrawn from said liquid-solid separation zone; a zone for collecting adduct forming organic compound as a liquid phase in the end of the horizontal vessel containing the heating means; and means for removing adduct forming organic compound from said heating means-containing end of said elongated horizontal vessel.

11. The apparatus of claim 10 wherein the means to urge the slurry through the separation zone and toward the heating means in the horizontal vessel is a piston adapted to reciprocate in said horizontal vessel.

12. The apparatus of claim 10 wherein the means to urge the slurry through the separation zone and toward the heating means in the horizontal vessel is an external pulse pump connected to the interior of said decomposition zone by a conduit.

References Cited in the file of this patent

UNITED STATES PATENTS

| | | |
|---|---|---|
| 2,714,586 | Lynch | Aug. 2, 1955 |
| 2,731,456 | Weedman | Jan. 17, 1956 |
| 2,763,637 | McKay et al. | Sept. 18, 1956 |
| 2,809,961 | Callahan | Oct. 15, 1957 |
| 2,813,851 | McKay | Nov. 19, 1957 |
| 2,823,172 | Rumberger et al. | Feb. 11, 1958 |
| 2,863,858 | Ray et al. | Dec. 9, 1958 |

UNITED STATES PATENT OFFICE

CERTIFICATE OF CORRECTION

Patent No. 2,938,022　　　　　　　　　　　　　　　May 24, 1960

Joseph W. Clark

It is hereby certified that error appears in the printed specification of the above numbered patent requiring correction and that the said Letters Patent should read as corrected below.

Column 6, line 52, strike out "decomposition" and insert the same after "combined" in line 51, same column 6; column 8, line 10, for "setting" read -- settling --; line 54, for "separating" read -- separation --.

Signed and sealed this 10th day of January 1961.

(SEAL)
Attest:

KARL H. AXLINE
Attesting Officer

ROBERT C. WATSON
Commissioner of Patents